(12) United States Patent
Lowe et al.

(10) Patent No.: US 10,308,536 B1
(45) Date of Patent: Jun. 4, 2019

(54) DOUBLE COIL EFFLUENT DISPERSAL APPARATUS AND METHOD

(71) Applicants: David Mark Lowe, Lake Stevens, WA (US); Richard D. Eldredge, Lake Stevens, WA (US)

(72) Inventors: David Mark Lowe, Lake Stevens, WA (US); Richard D. Eldredge, Lake Stevens, WA (US)

( * ) Notice: Subject to any disclaimer, the term of this patent is extended or adjusted under 35 U.S.C. 154(b) by 0 days.

(21) Appl. No.: 15/870,668

(22) Filed: Jan. 12, 2018

Related U.S. Application Data

(63) Continuation-in-part of application No. 14/611,246, filed on Feb. 1, 2015, now abandoned.

(60) Provisional application No. 62/448,903, filed on Jan. 20, 2017.

(51) Int. Cl.
| | | |
|---|---|---|
| *C02F 3/28* | (2006.01) | |
| *C02F 3/04* | (2006.01) | |
| *C02F 1/72* | (2006.01) | |
| *C02F 3/12* | (2006.01) | |
| *E02B 11/00* | (2006.01) | |

(52) U.S. Cl.
CPC ............... *C02F 3/288* (2013.01); *C02F 1/72* (2013.01); *C02F 3/04* (2013.01); *C02F 3/121* (2013.01); *E02B 11/005* (2013.01)

(58) Field of Classification Search
CPC .......... E02B 11/00; E02B 11/005; B09B 1/00; B09C 1/00; B09C 1/002
USPC ......................................... 405/36, 43, 44, 45
See application file for complete search history.

(56) References Cited

U.S. PATENT DOCUMENTS

| | | | | |
|---|---|---|---|---|
| 3,907,679 A | * | 9/1975 | Yost ................ | B01D 1/02 159/13.4 |
| 5,306,317 A | * | 4/1994 | Yoshizaki ........ | A01G 9/24 47/1.01 R |
| 5,433,759 A | * | 7/1995 | Benson ........... | A01B 45/02 47/1.01 R |
| 5,766,475 A | * | 6/1998 | Mayer ............. | C02F 3/006 210/104 |
| 6,309,539 B1 | * | 10/2001 | Mayer ............. | C02F 3/288 210/104 |
| 6,334,958 B1 | * | 1/2002 | Ruskin ............ | B01D 24/14 210/739 |
| 7,309,189 B2 | * | 12/2007 | Khire ............... | B09B 1/00 405/129.57 |
| 7,497,946 B2 | * | 3/2009 | Jessick ............ | C02F 1/006 210/170.08 |
| 8,070,949 B1 | * | 12/2011 | Terry, III ........ | C02F 3/1294 210/150 |
| 8,889,007 B2 | * | 11/2014 | Lowe ............... | C02F 3/006 210/104 |
| 9,273,456 B1 | * | 3/2016 | Miles .............. | E03F 1/002 |

(Continued)

*Primary Examiner* — Frederick L Lagman
(74) *Attorney, Agent, or Firm* — Joseph Z. Ellsworth

(57) ABSTRACT

The present invention is a wastewater treatment system utilizing a recirculating filter system comprising sand, gravel, or synthetic media. Septic effluent is continuously, or approximately continuously, dosed under pressure to the treatment media through pressure compensating drip irrigation emitters. The dosed effluent is treated and dispersed into a dispersal field using double coiled distribution lines that can alternate flow through emitters to rest the dispersal field. The double coil dispersal lines allow more emitters per unit area allowing treatment of the effluent more slowly and effectively.

15 Claims, 11 Drawing Sheets

(56) References Cited

U.S. PATENT DOCUMENTS

| | | | |
|---|---|---|---|
| 9,656,892 B2 * | 5/2017 | Potts | B09C 1/002 |
| 2006/0029473 A1 * | 2/2006 | Khire | B09B 1/00 |
| | | | 405/129.2 |
| 2006/0147270 A1 * | 7/2006 | Parker | E02B 11/00 |
| | | | 405/50 |
| 2010/0314327 A1 * | 12/2010 | Lean | B01D 21/01 |
| | | | 210/738 |

* cited by examiner

DOUBLE COIL EFFLUENT DISPERSAL APPARATUS AND METHOD

This application is a Continuation in Part of application Ser. No. 14/611,246 filed Feb. 1, 2015, which is a Continuation in Part of application Ser. No. 14/542,654 Filed Nov. 16, 2014 which is a continuation of application Ser. No. 13/181,515, now U.S. Pat. No. 8,889,007 filed Jul. 13, 2011, which was a Continuation in Part of application Ser. No. 12/378,716 filed Feb. 19, 2009. This application also claims the benefit of Provisional application 62/448,903 filed Jan. 20, 2017.

FIELD OF THE INVENTION

The present invention relates to the treatment of waste water from residential or commercial properties and more specifically an improvement in the dispersal of said treated water which improves treatment media life and reduces the footprint required to effectively meet government treatment requirements.

BACKGROUND OF THE INVENTION

As the population of the country increases so does the demand for land and housing. Many of these demands for land and housing result in people moving to areas that do not have public sewer systems and may have lot sizes too small for septic. Conventional onsite wastewater systems require a large land area, putting a premium cost on real estate in many locations or the soil in the area will not support a conventional system. The increasing price on real estate and the high density of residential and commercial building, make it desirable to reduce the area required for wastewater treatment and still treat the wastewater to acceptable standards. The amount of effluent a system can treat is directly related to the surface area of filter media available to the system and the amount of wastewater that is passed through the available filter media. Most sand, gravel, or synthetic media wastewater treatment systems are dosed intermittently, either a single pass or recirculated, and rely upon a repeat cycle timer and a pump to regulate the frequency and volume of the wastewater applied to the surface of the treatment media. The timers are set with specific on and off time intervals. The off times determine the number of doses over time and the on times determine the dose volume. In all cases, there are distinct dosing and resting periods to prevent overloading the media past the point of failure. Even in cases where drip irrigation tubing is used in treatment systems, very distinct dosing schedules are used. In recirculating sand and gravel filters as well as synthetic packed-bed-filters, repeat cycle timers are the traditional methodology for flow control. Therefore, there is a need for a wastewater treatment system that is compact in area, simple to use, and treats water continuously while maintaining the standards required by law.

In some areas there may not be a suitable depth of native undisturbed soil above a restrictive layer. A restrictive layer is a layer that prevents proper treatment of effluent. This can be a ground water table, bedrock, or soil that is too coarse. Typically, for proper treatment the effluent must have 2-4 feet of vertical separation between the bottom of the disposal component and a restrictive layer. Therefore a need exists for a system or device that properly treats effluent in areas where the restrictive layer is less than 2 feet from the surface of the soil.

PRIOR ART

In the prior art patent Chaffee et al. (U.S. Pat. No. 6,132,599) a waste water treatment unit that has a treatment media filter over the recirculation tank and dosing tank. This unit is compact but doesn't have a means for cleaning its filters or emitters.

Belhumeur (U.S. Pat. No. 6,506,298) is a waste water treatment filter that uses peat moss as the filtration media and has a mechanism the never allows more effluent into the filter than the filter can treat and has elongated discharge orifice that emit effluent on the filter media.

Belhumeur (U.S. Pat. No. 6,372,128) is a waste water treatment filter that uses peat moss as the filtration media and has a mechanism the never allows more effluent into the filter than the filter can treat.

Mayer (U.S. Pat. No. 6,309,539) is a waste water treatment system with a splitter system but does not have an inline filter that allows for a larger volume of wastewater treatment.

SUMMARY OF THE INVENTION

The need for more waste water treated in smaller and smaller areas is apparent in all growing cities. The present invention is a wastewater treatment system utilizing a recirculating filter system comprising sand, gravel, or synthetic media. Septic effluent is continuously, or approximately continuously, dosed under pressure to the treatment media through pressure compensating drip irrigation emitters. The system comprises a commonly known septic tank and recirculation tank. Septic tank effluent is collected in the recirculation tank, from which it is continually dosed by means of a pump to the top of the treatment media of the recirculating filter through pressure compensating drip emitters. Continuous dosing of diluted residential septic tank effluent through drip irrigation emitters provides a slow consistent application of liquid rich in organic material and pathogens over the treatment media. The slow discharge of effluent into the media creates a thin film of wastewater over the individual media particles as the liquid migrates to the bottom of the treatment unit. This allows for regular and continual contact of molecular oxygen, water, organic material, and bacteria. Treated wastewater or filtrate collected from the bottom of the recirculating filter returns to the recirculating tank, either by gravity flow or under pressure, through the flow splitter. During periods of low or no wastewater flow from the septic tank into the recirculation tank, the flow splitter will allow all or most of the filtrate from the treatment filter back into the recirculation tank. (By recirculating filtrate back into the recirculation tank, incoming septic tank effluent is diluted prior to being dosed to the filter). During periods of moderate or high wastewater flow, the flow splitter will allow all or a portion of the incoming filtrate to bypass the recirculation tank for final disposal.

In areas where the restrictive layer is less than two feet from the surface of the native undisturbed soil a new method must be utilized. If the surface is greater than 18 inches from the restrictive layer, the effluent must be secondarily treated before dispersal as described in the present invention and dispersed at least 6 inches below the undisturbed surface and at least 12 inches above the restrictive layer.

In areas where the restrictive layer is less than 18 inches from the undisturbed surface of the soil the dispersal system must move above the surface. The dispersal system may be buried in a sand media placed on the soil surface. The dispersal system is spaced apart from the soil surface by the sand media. The effluent is treated as it passes through the sand media and the native soil to an acceptable condition before reaching the restrictive layer. The entire treatment of the secondarily treated effluent may take place in the sand media if the undisturbed soil surface is the restrictive layer.

The present invention may treat effluent to "class A" water, which is useable water, prior to the dispersal and the water can be disinfected and contained for use in the home. This water may not be potable but may be suitable for toilets or landscape irrigation.

The OSCAR-LOWeFLOW™ (OS-LF) is a treatment and dispersal system that requires only 12" of soil to restrictive layer, has the smallest foot print of any technology available, and there is NO UV light! The OSCAR (Onsite Sand Coil Area Recharge) is an onsite sewage disposal and disinfection component when used with the LOWeFLOW™ treatment system. The OSCAR is comprised of a 6" layer of C-33 sand media and a series of pre-assembled Netafim Bioline™ drip tubing coils. The sand media is placed on a prepared soil surface. OSCAR coils are then placed on the sand media and then are covered with another 6" of sand media. The sand/soil interface is the discharge point of the treated wastewater. Vertical separation is measured from the original soil surface to the restrictive layer.

The OSCAR-LOWeFLOW™ treatment system is comprised of a recirculation filter, a septic tank, recirculation/mixing tank, headworks, discharge/clarifier tank, and the OSCAR unit.

Wastewater is collected in a standard septic tank where gross solids are settled out and primary treatment occurs. Septic tank effluent flows from the septic tank into the recirculation tank.

Liquid in the recirculation tank is mixed with treated filtrate from the gravel filter. The mixed liquid is dosed to a drip tubing network called a Coil in the top of the LOWeFLOW™ filter.

Treated filtrate from the LOWeFLOW™ filter flows by gravity back to the recirculation tank through the splitter valve. The position of the splitter valve determines the flow path of the filtrate. When the liquid level in the recirculation tank is high enough to seat the splitter valve, all of the filtrate passes into the clarifier/discharge tank, otherwise, all of the filtrate returns to the recirculation tank. Liquid accumulates in the clarifier/discharge tank. Liquid from the clarifier/discharge tank is timed dosed to the OSCAR coils where final treatment and dispersal occurs.

Design flows of the OSCAR-LOWeFLOW™ system range from 240 gpd to 100,000 gpd. The OSCAR-LOWeFLOW™ system was tested under National Sanitation Foundation's standard 40 protocol and the Washington State Department of Health's fecal coliform testing requirements. Average treatment level results for the six month test were:

5 mg/l $CBOD_5$
9 mg/l TSS
27 fecal coliform colonies/100 ml, MPN
Turbidity ranged from 1-2 NTU The Reverse flush headwork is a combination of two products: an electronic controller and a headwork (a series of solenoid valves, pressure gauges, and a disc filter). The headwork provides physical filtration of water born debris from liquid dosed to a drip irrigation network that could cause clogging of drip emitters. By changing the position of a series of solenoid valves the flow of liquid can be reversed through the disc filter at a high enough velocity and pressure to dislodge previously trapped debris on and in the disc filter. The drip tubing is forward flushed at a high velocity through the disc filter. The controller provides the control logic that coordinates the time sequence between the pump and solenoid valves.

The headworks device is a combination of five normally closed solenoid valves, a disc filter, and three pressure gauges. The valves are arranged in such a fashion as to provide flow in three distinct cycles: 1.) dose a network of drip irrigation tubing through the disc filter, 2.) flush the drip tubing through the disc filter at a velocity sufficient to produce a turbulent flow able to scour away the majority of any buildup of slime or plaque on the interior walls of the tubing network, and 3.) reverse the flush through the disc filter at a high pressure and flow to dislodge trapped debris.

The three pressure gauges are arranged with one directly upstream from the disc filter, one directly downstream from the disc filter, and one located at the distal end of the drip tubing network. The three gauges allow for a simultaneous reading of the pressures throughout the entire system.

The electronic controller possesses the digital logic controls to coordinate the sequencing of a pump and the five solenoid valves in the headworks. At rest, no electrical impulse is sent to the pump or any of the solenoid valves. The pump is at rest and all valves are closed. During the dose cycle, the controller will energize the pump and two solenoid valves, allowing liquid to flow through the disc filter and into a drip tubing network. Once the tubing is completely pressurized even distribution of liquid out the tubing emitters is accomplished. After each dose cycle there is a predetermined and adjustable rest period between doses. After a predetermined and adjustable number of dose cycles, the controller with perform a reverse flush cycle of the disc filter. The controller will energize the pump and two different solenoid valves reverse the flow through the disc filter. The reverse flow and pressure cause the discs in the filter to separate to allow liquid to pass through, dislodging trapped debris. The flush liquid and debris are vented out of the system. After a predetermined and adjustable number of reverse flush cycles the controller will energize the pump and three solenoid valves: the two solenoid valves operating during the dose cycle and an additional solenoid valve. Hydraulic flow through the disc filter and drip tubing network reaches a velocity that creates a turbulent flow and scours the internal walls of the tubing network of slime and plaque accumulations. This flow is also vented out of the system.

DETAILED DESCRIPTION OF THE PREFERRED EMBODIMENT

Figure 1:
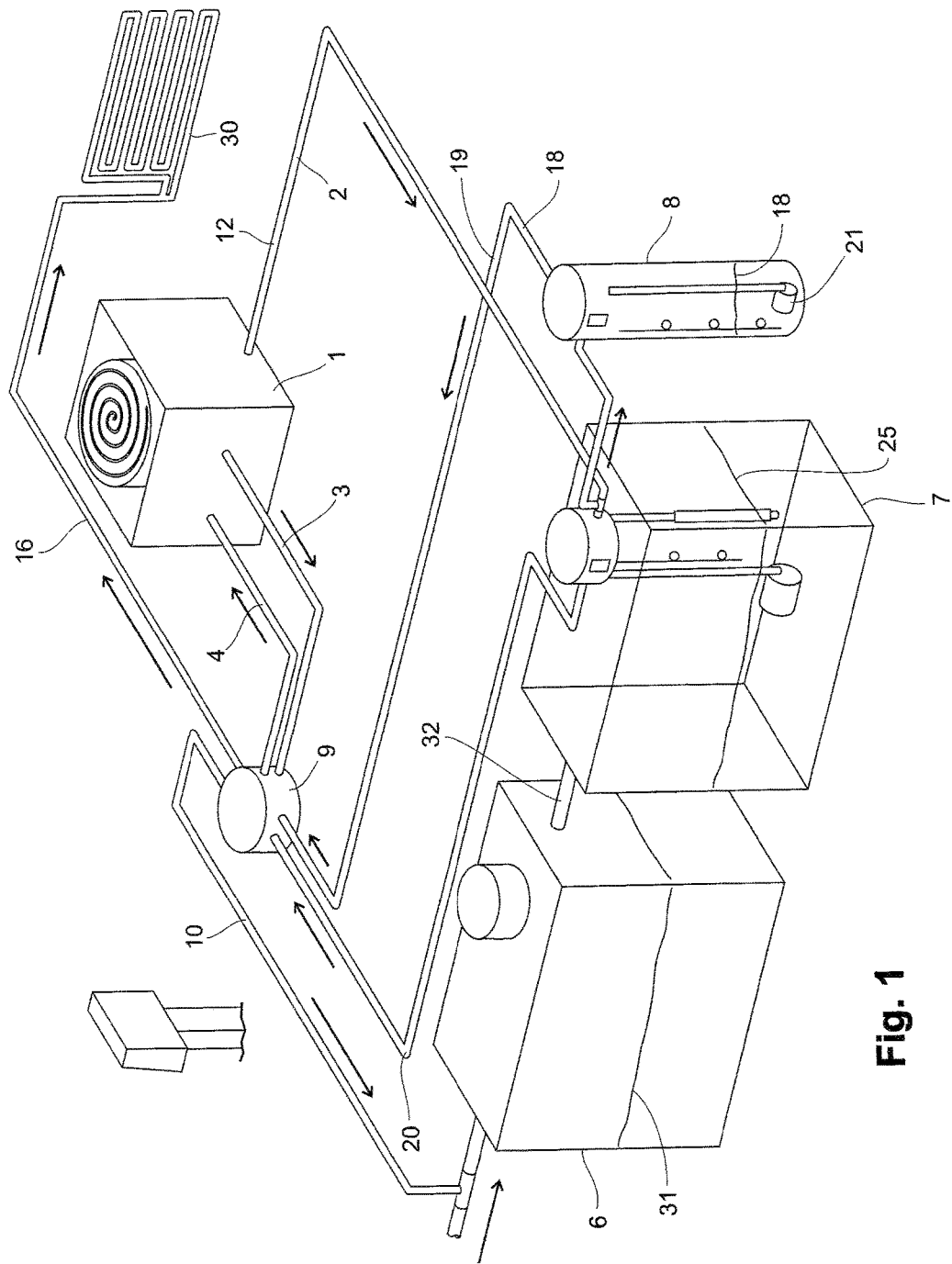
FIG. 1: Isometric view of the entire waste water treatment system with arrows showing flow of effluent in each pipe.
Figure 2:
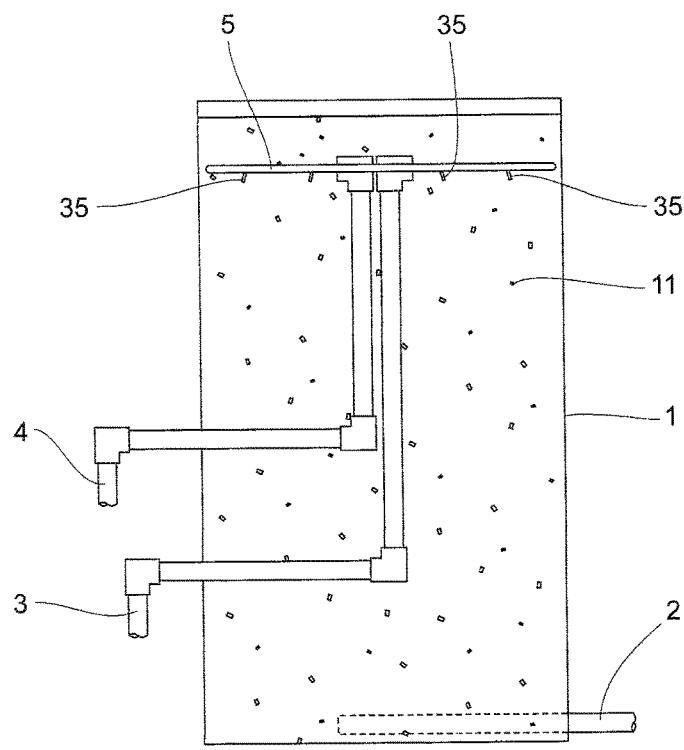
FIG. 2: Section view through the centerline of the media filter.
Figure 3:
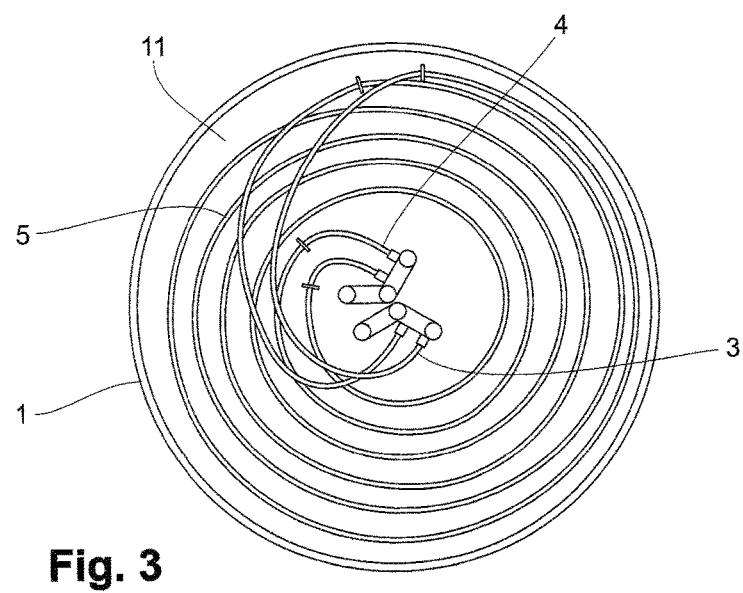
FIG. 3: Top view of the media filter showing the coils.
Figure 4:
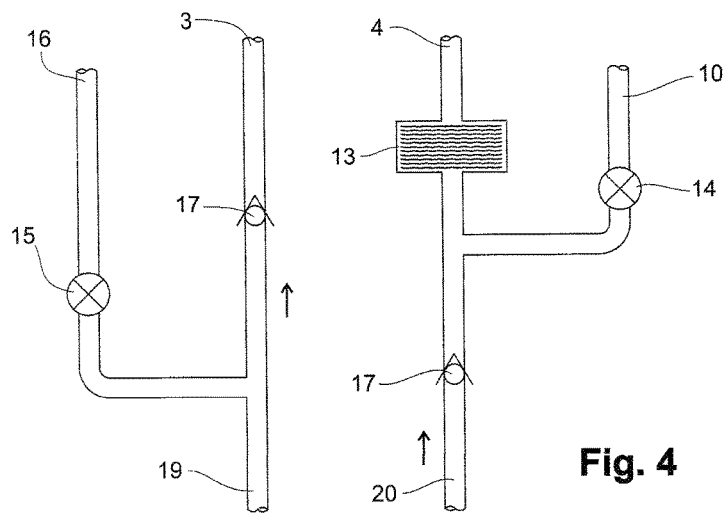
FIG. 4: Top view of the headworks. Showing the valves and filters.
Figure 5:
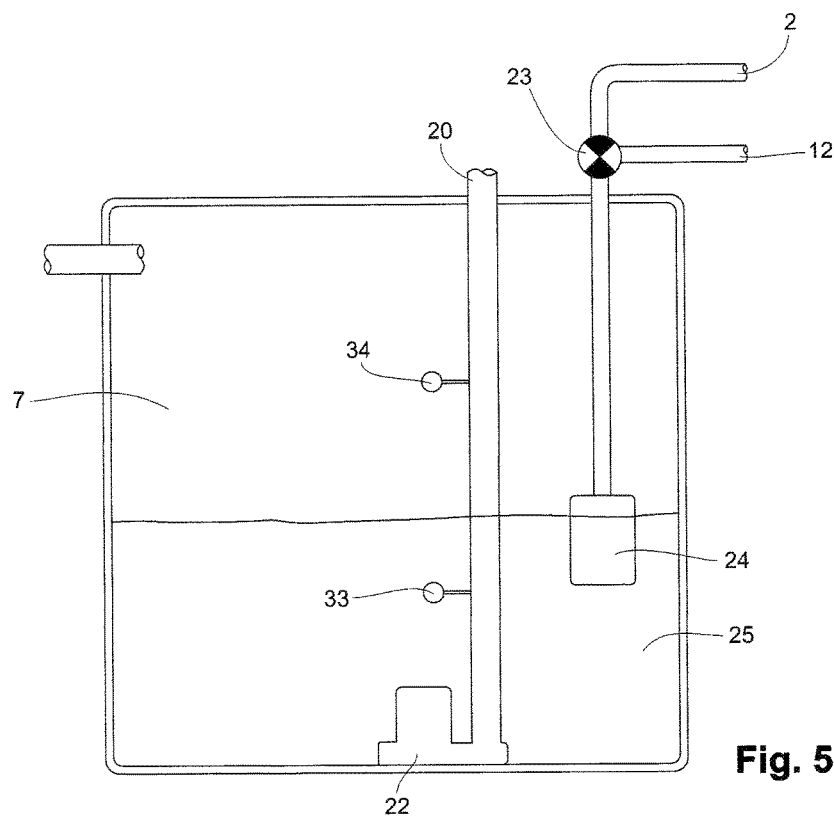
FIG. 5: Section cut of the recirculation tank.

The preferred embodiment of the present invention is a waste water treatment apparatus for treating waste water from residential or commercial buildings and the method for using the apparatus. The apparatus comprises a commonly known and used septic tank 6 which receives raw sewage 31 from a residence or commercial building. The solid waste only makes a fraction of the raw sewage 31 and remains in the septic tank 6. When the septic tank 6 is full the solids settle to the bottom and the primary untreated effluent 32 flows into the recirculation tank 7. The recirculation tank 7 has a recirculation pump 22 that will preferably be continually pumping diluted effluent 25 which is a mixture of the filtrate 12 and primary untreated effluent 32. Continual pumping maximizes the amount primary untreated effluent 32 that can be treated. The recirculation tank 7 has a recirculation pump redundant off float 33 which turns off the recirculation pump 22 when the diluted effluent 25 is below the desired level due to no system use or evaporation. If the recirculation pump fails the water level will continue to rise until the recirculation tank alarm float 34 is actuated and a technician will be alerted and fix the system.

The diluted effluent 25 is pumped through a dosing line 20 to a head works 9. In the head works 9 the dosing line 20 has a check valve that doesn't allow liquid to travel back to the recirculation pump 22. The dosing line 20 during normal operation goes to an inline filter 13 preferably a commonly known disk filter and then to a supply line 4. The supply line 4 enters the media filter 4 preferably at the bottom and travels under the treatment media 11 and then up through the center of the media filter 1 and attaches to the emitter coil 5. The emitter coil 5 is within the treatment media 11 preferably near the top. Drip emitters 35 preferably, pressure compensating drip irrigation emitters, release diluted effluent 25 which mixes with oxygen in voids of the treatment media 11. The emitter coil 5 is coiled to minimize head loss and to allow closer spacing of drip emitters 35. The diluted effluent 25 flows across the particles in the media 11 and is in continual contact with molecular oxygen, water, organic material, and bacteria. The dilute effluent 25 becomes filtrate 12 after the treatment process and collects in the bottom of the media filter 1. The filtrate 12 then enters the return line 2 and flows back to a split flow tee 23 outside the recirculation tank 7. If the level of diluted effluent 25 is high in the recirculation tank 7 then the splitter valve 24 closes and filtrate backflows through the split flow tee 23 to allow all filtrate 12 to pass to preferably the discharge basin/surge tank 8 or to a drain field 30. If the level of diluted effluent 25 is low in the recirculation tank 7 then, the splitter valve 24 opens to send the filtrate 12 back into the recirculating tank 7 to further dilute the dilute effluent 25.

When the level of treated water 18 is low in the discharge tank 8 the pump off float 29 keeps the discharge/flush pump 21 turned off. When treated water 18 is high, the water available float 28 allows the discharge pump/flush pump 21 to pump excess treated water 18 out through the discharge/flush line 19 but keeps enough water available for flushing the system. If the water level is too high the alarm float 27 is actuated and sounds an alarm and shuts off the recirculation pump 22.

Periodically, the inline filter 13, and the emitters 35 will get clogged and the emitter coil 5 will get build up. At regular intervals or when pressure behind the inline filter 13 is high due to build up, the lines will be flushed. The flushing sequence requires the normally open valve 15 to close and at the same time the normally closed valve 14 to open and the discharge/flush pump 26 to turn on. This discharge/flush pump is preferably higher pressure and causes the treated water 18 to travel through the discharge/flush line 19 to the head works 9. Instead of the treated water 18 moving out the discharge line 16 to the drain field 30, valve 15 is closed so it will travel through the check valve 17 and into flush line 3. The high pressure treated water 18 will then clean the emitter coil 5 and clean the emitters 35. The reverse direction and the preferably higher pressure of the treated water 18 will also clean the inline filter 13. The dirty flush water will not go to the recirculation pump 22 because the check valve 17 prevents it. Instead, it will travel through the open normally closed valve 14, through the inline filter flush line 10, and back into the septic tank 6.

The secondarily treated water is essentially free of solid particles (less than 15 mg/L) but contains 50,000 to 150,000 fecal coliform colonies. The secondary treatment process reduces these colonies to less than 200. It is desirable to remove these fecal coliforms before the effluent is introduced into ground water.

The present improvement is a combination of two methodologies: a subsurface drip dispersal system and an at-grade dispersal system. The improvement acts as a disinfection unit and a disposal device for an onsite sewage treatment and dispersal system. The subsurface drip system provides discrete distribution of secondary treated wastewater into sand media placed on a prepared soil surface. The sand media removes fecal coliform bacteria and potential pathogens through physical and biological processes. The interface between the sand media and the soil surface is where treated wastewater is dispersed into the environment. Sand is placed on the prepared soil surface, 6 inches to 12 inches thick. The subsurface drip tubing is arranged in a network referred to as a coil and is placed on top of the sand media. The coils are then covered with 6" of sand media.

The subsurface drip system is comprised of the coils, a pumping system, and a headwork device. The headworks filters treated wastewater and controls the flow and pressure of the dosing and flush sequences. The Coils have two manifolds: one on the first end of the drip tubing within the Coil is called a supply manifold and the second manifold on the distill end of the Coils is called the flush manifold. Treated wastewater is pumped through the headworks inline disc filter through the supply line connected to the supply manifold. Wastewater entering the supply manifold pressurizes the drip tubing causing the drip to emitters to discharge wastewater into the sand media. The flush manifold is connected to the headworks via the flush line. Periodically the drip tubing in the Coil is forward flushed at high velocity to remove any slime or debris that may have accumulated.

There are three types of headwork arrangements that could be implemented: manual flush, dose-flush, and reverse flush.

Manual flush headworks: A manual flush headworks is comprised of a container, an inline disc filter, three pressure gauges, and a manual flush valve. Gauges are placed pre and post inline disc filter, and between the flush manifold and flush valve. The pressure gauges pre and post disc filter are to indicate pressure loss through the disc filter due to accumulation of water borne debris. The function of the third gauge is to measure the remaining pressure after the flow and pressure loss of the Coils. Wastewater is pumped through disc filter, the supply manifold, and into the Coils. Wastewater flow dead heads against the flush valve in the headworks causing the internal pressure in the Coils to increase to the operating pressure.

Cleaning or flushing of the inline filter is accomplished by opening the filter housing, removing the disc filter cartridge, and manually cleaning or flushing the discs.

Flushing the Coils is accomplished by manually operating the pump while the flush valve is opened.

Dose-flush headworks: A dose-flush headworks is comprised of a container, an inline disc filter, three pressure gauges, a flow meter, and a manually operated flush valve. A gauge is placed pre and post inline disc filter, and between the flush manifold and flush valve. The pressure gauges pre and post disc filter are to indicate pressure loss through the disc filter due to accumulation of water borne debris. The function of the third gauge is to measure the remaining pressure after the flow and pressure loss of the Coils. Wastewater is pumped through the disc filter, flow meter, the supply manifold, and into the Coils. Wastewater flow is restricted through the flush valve in the headworks causing the internal pressure in the Coils to increase to the operating pressure and allowing enough flow of wastewater through the Coil network to accomplish scouring velocity. Flushing and dosing of the Coils occur simultaneously. Cleaning or flushing of the inline filter is accomplished by opening the filter housing, removing the disc filter cartridge, and manually cleaning or flushing the discs.

Reverse flush: A reverse flush headworks is comprised of a container, an inline disc filter, three pressure gauges, and a five electrical solenoid valves. A gauge is placed pre and post inline disc filter, and between the flush manifold and Coil flush solenoid valve #5. The pressure gauges pre and post disc filter are to indicate pressure loss through the disc filter due to accumulation of water borne debris. The function of the third gauge is to measure the remaining pressure after the flow and pressure loss of the Coils. Wastewater is pumped through solenoid valve V1, the disc filter, than solenoid valve V2, through the supply line and manifold, and into the Coils. Wastewater flow dead heads against the solenoid V5 valve in the headworks causing the internal pressure in the Coils to increase to the operating pressure. Cleaning or flushing of the inline filter is accomplished by reversing the flow through the disc filter. Wastewater is pumped through solenoid valve V3, through the disc filter, solenoid valve V4, and then through the vent line. The Coil flush is accomplished when wastewater is pumped through solenoid valve V1, the disc filter, than solenoid valve V2, through the supply line and supply manifold, and into the Coils. Solenoid valve V5 is opened to allow liquid to flow through the tubing network at scouring velocity.

At-grade dispersal: The at-grade dispersal component receives small discrete volumes of secondary treated wastewater from the Coils. Wastewater migrates through the sand media through capillary rise, matrix potential, and gravity. The movement of water through the sand is in a non-saturated flow. Fecal coliform bacteria and potential pathogens are physically attached to the surface of the media particles. The attachment allows biological processes to consume these organisms as the water continues to move through the media. When the wastewater flow reaches the bottom of the media it is incorporated into the soil underlying the at-grade dispersal system. Wastewater is now dispersed back into the environment through the receiving soil.

An embodiment of an apparatus for wastewater dispersal comprises a treatment mound 101 made up of a treatment media 104 which is typically sand but may be many other materials. Treatment media can be natural sand, synthetic media, or peat moss.

The treatment mound 101 is typically treatment media 104 piled on a dispersion soil surface 105 and is therefore above the native soil surface 105. The treatment media 104 may be a depth D2 of 6 to 12 inches deep. A number of dispersal coils 102 are put on top of the treatment media 104 and then approximately 6 inches of treatment media 104 put over the dispersal coils 102. The treatment mound is most necessary when the native soil surface 105 is a distance D1 between 0 and 24 inches above a restrictive layer 106. The dispersal coils 102 provide a discrete distribution of secondary treated waste water into the treatment media 104. The dispersal unit 107 comprises the dispersal coils 102 attached to a supply manifold 103a and to a flush manifold 103. The supply manifold 103a provides the dispersal coils 102 with effluent to be released. The flush manifold 103 provides back pressure during normal operation and a pathway for fluid flush during a flush cycle.

An embodiment of the invention may treat effluent until it is "class A" water when dispersed into the native soil. The treated water may be reclaimed through a reclamation pipe 110 to be used for flushing toilets, irrigation, and as influent for potable water treatment process. The reclamation process may include putting a non-permeable material 109 under the treatment media 104 or under the native soil 105 at a depth where disinfection of the water will occur. The treated and disinfected water will flow to a reclamation pipe 110 and pumped away.

Reclaimed water is water meeting the following treatment level: pH 6.0-9.0, BOD5 10 mg/l, fecal coliform non-detect, turbidity 2.2 NTU (USEPA).

When the dispersion soil 105 is coarse gravel 108, it will not disinfect the effluent as it passes through. A portion of the dispersion soil 105 may be removed and replaced with the treatment media 104, wherein the treatment media is at or below a native soil surface 105.

The supply manifold 103a may have a filter 112 and pressure gauges 113 on each side of the filter 112. These pressure gauges show the drop in pressure through the filter which indicates when the filters need to be changed. An exemplary pressure drop that may indicate the filter needs flushing is between 2 and 4 pounds per square inch (psi).

The flush manifold also has a third pressure gauge 114 to determine lost pressure in the dispersal coils 102 and may have a manual valve 111 for flushing the dispersal coils 102.

The dispersal unit 107 may have a flowmeter 116 configured to measure flow in a supply manifold and a fifth valve 111 or V5 in the flush manifold 103 configured to restrict flow to attain an operating pressure in the dispersal coils 102 and allowing enough flow of wastewater through the dispersal coil 102 to accomplish a scouring velocity at the same time. This would prevent buildup of slime or other organisms that thrive in the nitrogen and oxygen rich treatment water. This may also require a larger pump to maintain the necessary pressure and the fluid flow rate. Operating pressure will vary depending on design capacity between 10-45 psi; scouring velocity in tubing is 1 feet per second (fps) to 5 fps.

Figure 13:
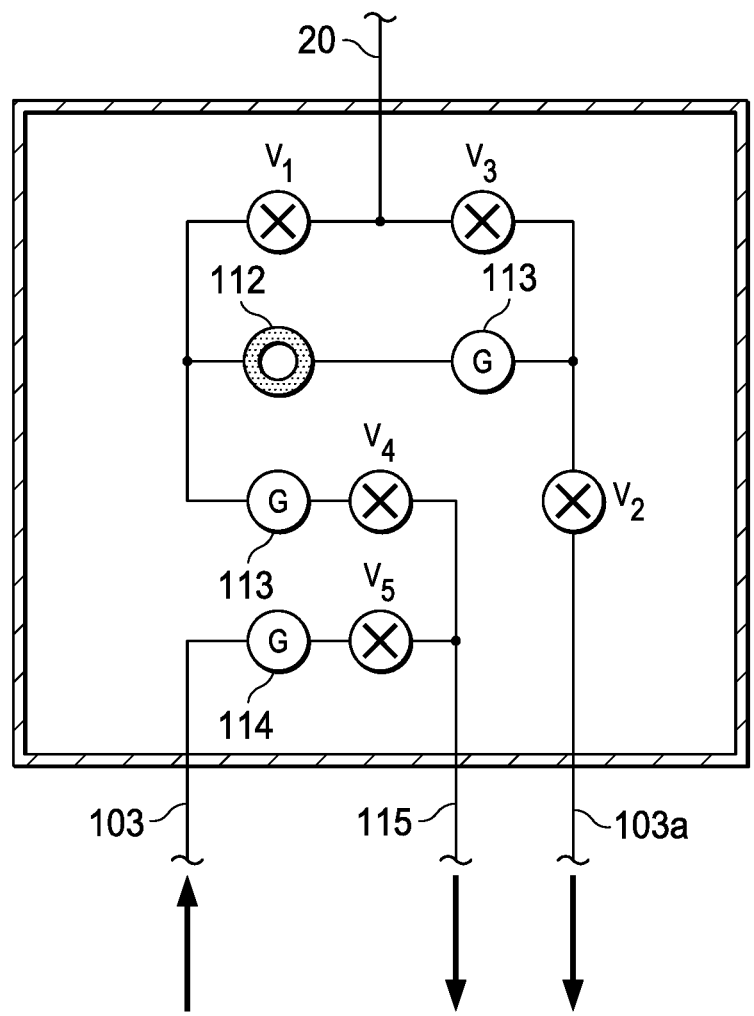
FIG. 13: Diagram of exemplary head works.

Referring to FIG. 13, in an example embodiment the dispersal unit 107 may have first valve V1 and second valve V2 open to allow secondary treated water to flow through inline filter 112 and out the supply manifold 103. Fifth valve V5 is closed and pressurizes the dispersal coils 102. To clean the inline filter 112; the dispersal unit 107 closes all valves and opens the third valve V3 and fourth valve V4 allowing wastewater to be pumped through the filter in reverse and then through a vent line 115. This cleans the filter 112 of particles and debris and the unfiltered water goes back into the treatment cycle. Cleaning the dispersal coils is accomplished by pumping wastewater through the first valve V1, the second valve V2, the dispersal coils 102 and through the fifth valve V5 open to atmospheric pressure. The pressure drops and this allows wastewater to flow through the dispersal coils at a scouring velocity. Scouring velocity is the velocity at which slime and growth is pulled from the tubing by the moving water.

Figure 11:
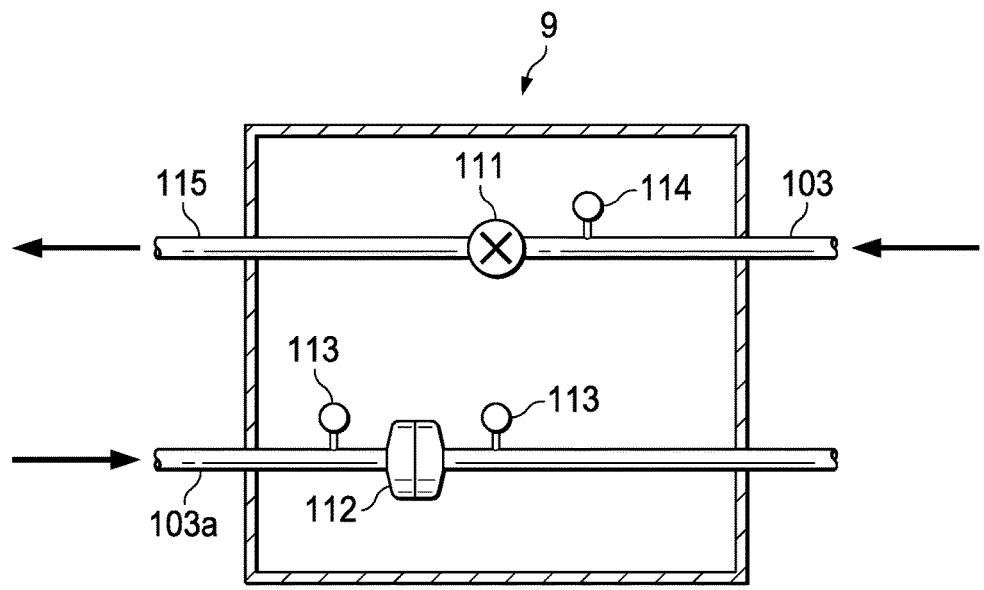
FIG. 11: Diagram of exemplary head works.
Figure 12:
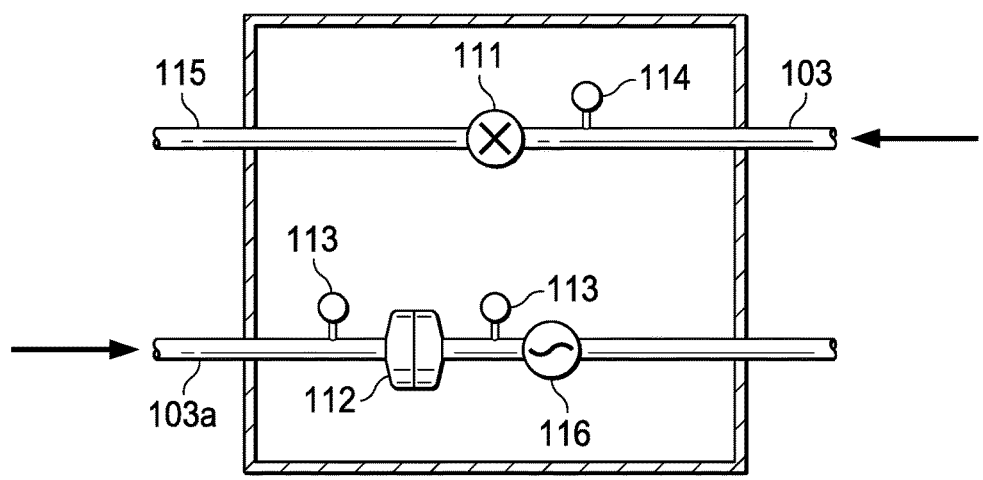
FIG. 12: Diagram of exemplary head works.

Referring to FIG. 11, an example embodiment comprises a third gauge 114 configured to measure pressure loss from the dispersal coils 102, a flush manifold 103 venting 115 to atmospheric pressure, a fifth valve V5 or 111 configured to allow enough flow of wastewater through the dispersal coil 102 to accomplish a scouring velocity when the pressure loss at the third gauge is undesirable.

A method for wastewater treatment may comprise, providing a treatment mound 101 comprising treatment media 104, placing the treatment mound 101 on the surface of native soil 105, and providing treated water into the treatment media using distribution coils 102. An advantageous method for wastewater treatment further comprises, filtering the effluent for water borne particles using a filter 112, monitoring pressure loss at gauges 113 on either side of the filter 112 to indicate a clogged filter, and monitoring pressure at a third pressure gauge 114 to indicate clogged dispersal coils 102.

A further advantageous method for wastewater treatment further comprises reversing the flow through the filter 112 to flush the filter, wherein, reversing the flow is accomplished by, closing all valves V1-V5 and opening third valve V3 and fourth valve V4 allowing wastewater to be pumped through the filter and then through a vent line 115.

A still further advantageous method for wastewater treatment further comprises, flushing growth in the dispersal coils 102 by closing all valves V1-V5, opening first valve V1, second valve V2, and fifth valve V5 or 111, pumping wastewater through a first valve V1, a second valve V2, the dispersal coils 102 and through a fifth valve V5, which vents 115 to atmosphere to allow wastewater to flow through the dispersal coils 102 at a scouring velocity.

A still further advantageous method for wastewater treatment further comprises, measuring the pressure at a third gauge 114 which indicates pressure loss from the dispersal coils 102, venting a flush manifold 103 to atmospheric pressure through vent 115, measuring a flow velocity of wastewater using a flow meter 116, adjusting a fifth valve V5 or 111 to attain an operating pressure in the dispersal coils 102 and allowing enough flow of wastewater through the dispersal coil 102 to accomplish a scouring velocity.

A still further advantageous method for wastewater treatment further comprises, measuring the pressure at a third gauge 114 after pressure loss from the dispersal coils 102, venting a flush manifold 103 to atmospheric pressure through vent 115, opening a fifth valve V5 or 111 to allow enough flow of wastewater through the dispersal coil 102 to accomplish a scouring velocity when the pressure loss at the third gauge 114 is undesirable.

The OSCAR-II (Onsite Sand Coil Area Recharge) 201 is a single pass, attached growth, drip dosed, treatment and disposal device intended to treat and dispose of household wastewater into a soil environment or a precursor for water re-use systems. The devise may be composed of a layer of ASTM C-33 sand 104; a series of double coiled pressure compensating drip dispersal tubing 203 and 204, or a series of single coiled pressure compensating drip dispersal tubing 102; a two zone reverse flush headworks box 202, or a single zone reverse flush headworks box 9.

Figure 14:
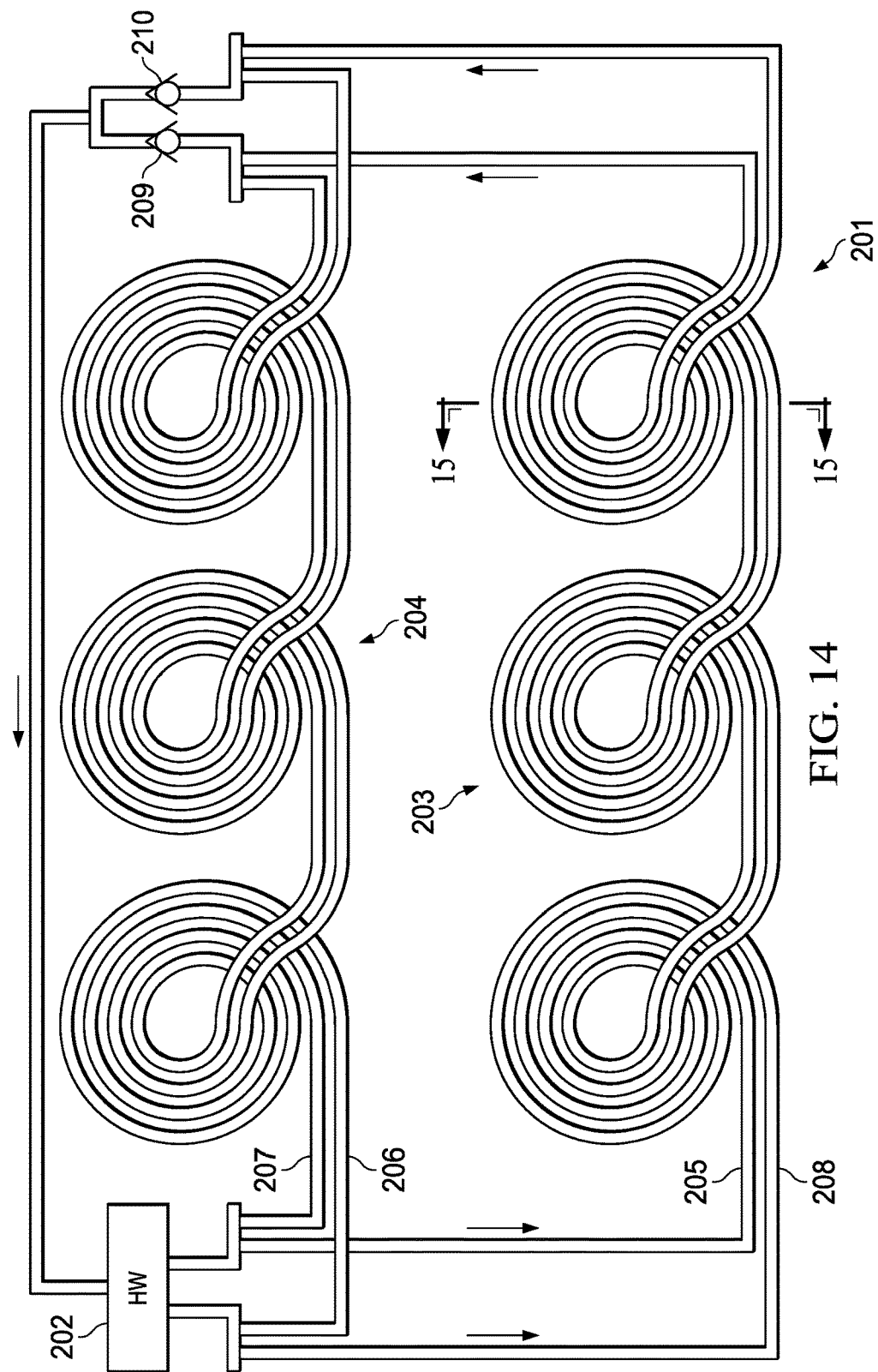
FIG. 14: Plan view of an exemplary dispersal unit.
Figure 15:
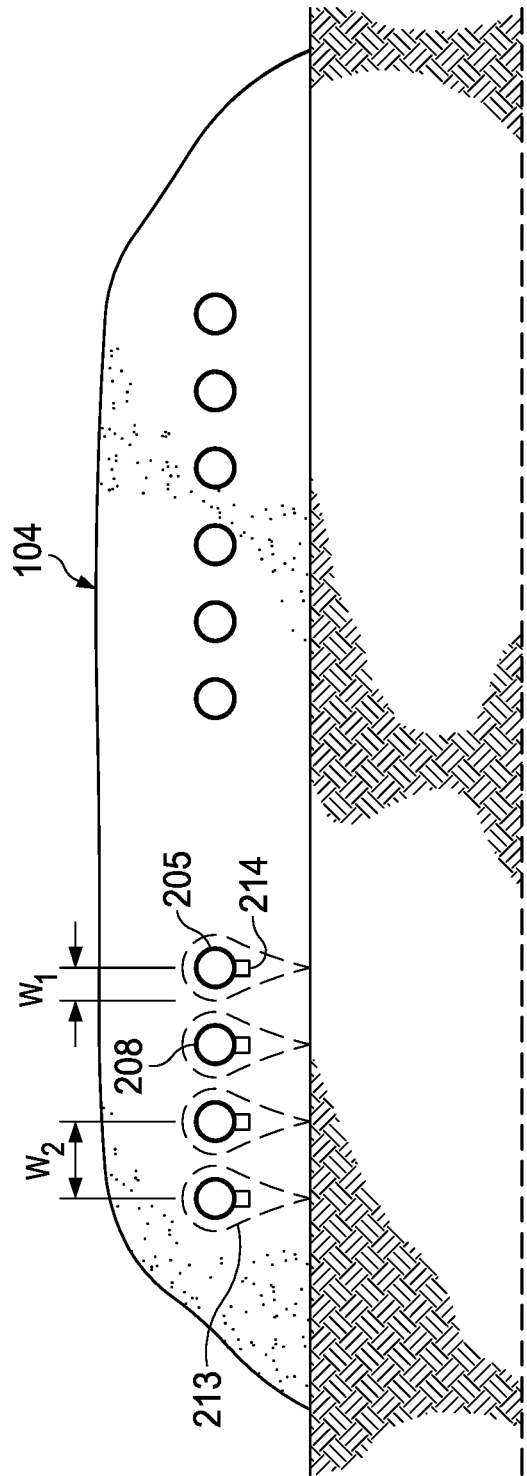
FIG. 15: Cut away view of an exemplary dispersal unit.
Figure 16:
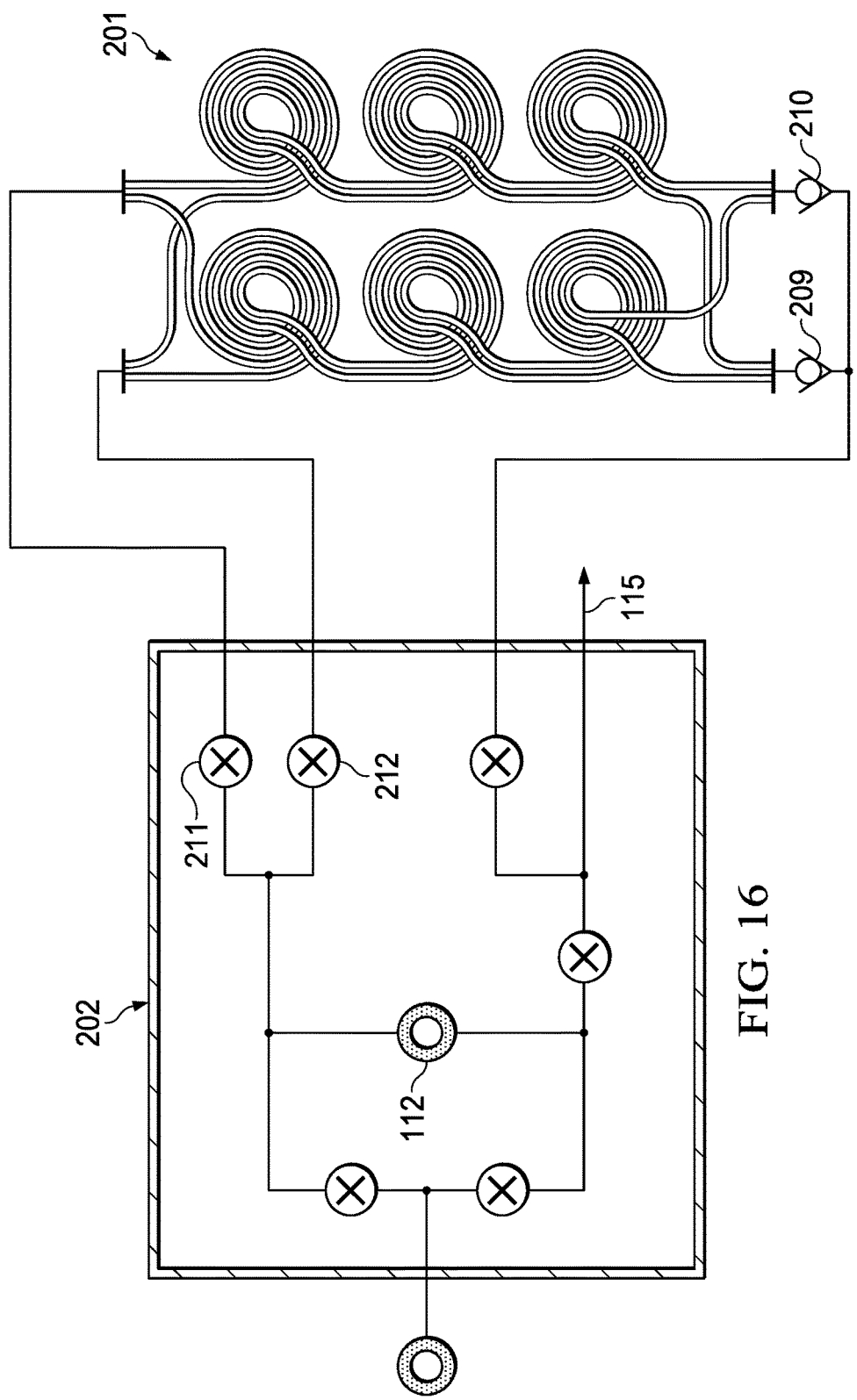
FIG. 16: Plan view of a blown up head works and dispersal unit.

In one Example seen in FIG. 14, a layer of C-33 sand 113 is placed on a prepared soil surface 112. The drip tubing coils 108 are placed on the sand layer and then covered by another layer of C-33 sand. Each set of drip tubing coils are connected in series and parallel to form two distinct networks and connected to a headworks box, pump and control panel. The two networks are dosed using a repeat cycle timer to provide distinct and discrete dosing events. Each network is used for a prescribed number of dose events (approximately 24-48 hours) while the other network is rested. Each network of tubing coils has the ability to treat 100 percent of the daily design flow of wastewater. Alternating the networks rests the emitters and prevents emitter fatigue, thereby increasing the useful life span of the emitters. Alternating the networks also increases the use of the sand media without over taxing any portion of the sand.

Figure 6:
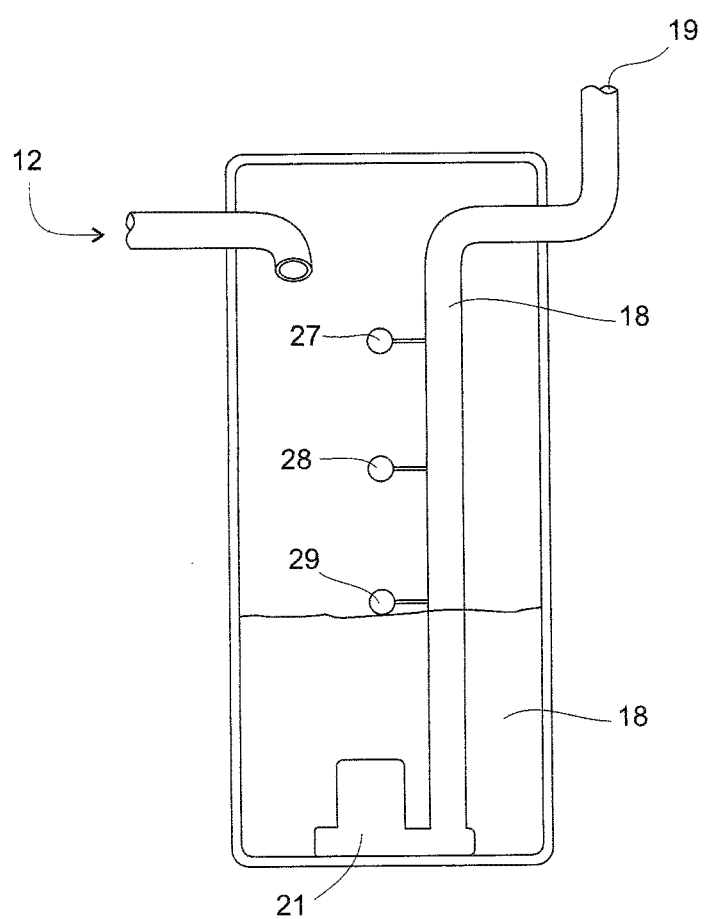
FIG. 6: Section cut of the surge tank.

In another example seen in FIG. 6, a layer of C-33 sand 113 is placed on a prepared soil surface 112. The drip tubing coils 108 are placed on the sand layer and then covered by another layer of C-33 sand. The drip tubing coils are connected in parallel and connected to a headworks box, pump and control panel. The coils 108 are dosed using a repeat cycle timer to provide distinct and discrete dosing events. The coils are dosed intermittently by pressurizing the system approximately $\frac{1}{4}^{th}$ of the time. Intermittent flow rests the emitters and prevents emitter fatigue, thereby increasing the useful life span of the emitters. Intermittent flow also increases the use of the sand media without over taxing any portion of the sand.

Household wastewater is collected in a septic tank 120 where primary treatment occurs. Clarified septic tank effluent flows by positive displacement to the dose tank 119. Septic tank effluent accumulates in the dose tank 119. An electronic float switch in the dose tank signals an electronic control panel that enough effluent has accumulated for the dosing sequence to begin.

The dose pump and reverse flush headworks are coordinated by a control panel. Septic tank effluent is delivered to the headworks where the effluent is filtered through a disc filter 106 to remove water borne debris. Effluent is then dosed to a drip tubing network 100. After a prescribed number of dose events the flow of effluent through the disc filter 106 is reversed. The reverse flow of effluent dislodges trapped solids and is vented to the inlet of the septic tank. Next, the drip tubing network that is currently in use is forward flushed and the liquid vented to the inlet of the septic tank 120. Next the tubing network that was at rest is now forward flushed. After the forward flush the network that was at rest is now in use for a prescribed number of dose cycles. This process is continually repeated.

Effluent dosed through the emitters into the sand layer receives further treatment through physical, biological, and chemical processes. By time dosing effluent with small, discrete dose volumes and then alternating the tubing networks, the accumulation of biological substances within the sand profile is eliminated. The drip tubing allows for a precise dose volume and delivery location of septic tank effluent while the sand layer provides a slow, natural path for the treated wastewater to enter the receiving soil.

Alternately, effluent dosed through the emitters into the sand layer receives further treatment through physical, biological, and chemical processes. By time dosing effluent with small, discrete dose volumes and then not dosing for a period of time, the accumulation of biological substances within the sand profile is eliminated. The drip tubing allows for a precise dose volume and delivery location of septic tank effluent while the sand layer provides a slow, natural path for the treated wastewater to enter the receiving soil.

In FIG. 6 a single network coil comprises multiple coils in parallel. The Single network Headworks 116 for the single network coil comprises five valves. Opening valve one 101 and valve two 102 doses coils 108. Occasionally, the filter 106 need to be flushed by opening valve three 103 and valve four 104. The full pump pressure is pushing effluent through the disk filter 106 backwards and cleans out any debris. To clean the coils 108: valve one 101, valve two 102 and valve five 105 open. This allows full flow of effluent to move through the coils back into the dose tank 119. This fast moving water cleans out any growth or debris. The supply manifold 107 supplies coil 108 with effluent. The flush manifold 109 provided back pressure on the coils 108 and only has moving water during a flush cycle.

Figure 7:
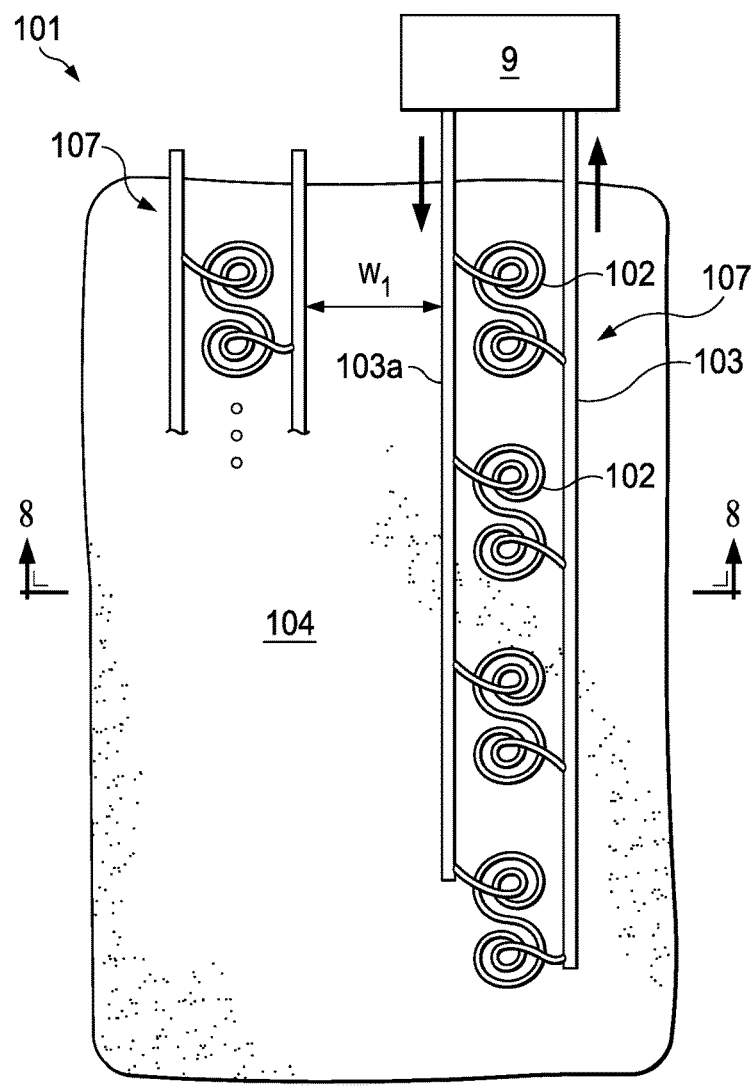
FIG. 7: Plan view of an exemplary dispersal unit.
Figure 8:
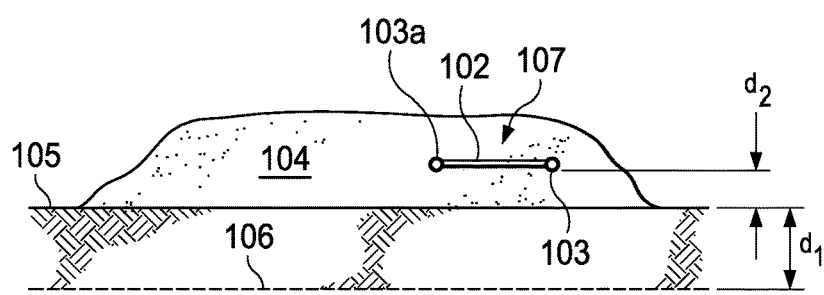
FIG. 8: Cut view of the exemplary dispersal unit of FIG. 7.
Figure 9:
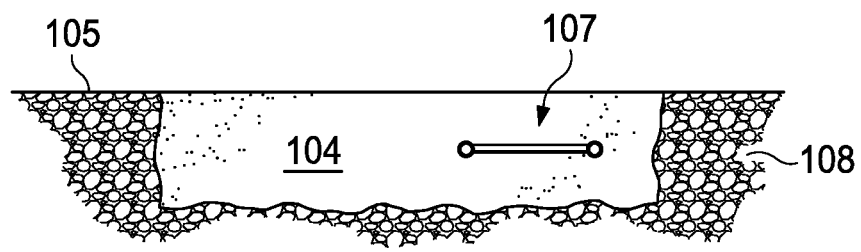
FIG. 9: Cut view of an exemplary dispersal unit in coarse soil.
Figure 10:
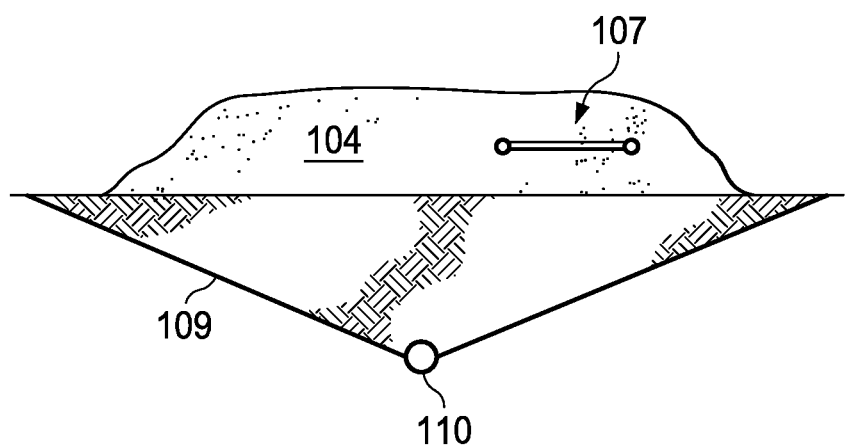
FIG. 10: Cut view of an exemplary dispersal unit with a reclamation pipe.

In FIG. 7, manual headworks 117 comprises one valve. The effluent flows through the pressure gauges 110 and a disk filter 106 and flow meter 111 out to the dosing coils. If the pressure drop is too high over the disk filter it can be cleaned manually. If the pressure drop in the system is too high, the manual valve 121 can be opened to let the full flow of effluent clean out any debris. This effluent drains back into the dosing tank.

A septic dispersal system 201 has a headworks 202 which distributes the effluent from the septic system to the dispersal field. The dispersal field 201 comprises a first double coil dispersal line 203, wherein the first double coil dispersal line 203 comprises two distribution tubes 205, 208 substantially adjacent extending in a horizontal coil. A second double coil dispersal line 204 adjacent the first double coil dispersal line 203 wherein, one distribution tube 205 from the first double coil dispersal line 203 and one distribution tube 206 from the second double coil dispersal line 204 flow in parallel. A second distribution tube 208 from the first double coil dispersal line 203 and a second distribution tube 207 from the second double coil dispersal line 204 flow in parallel. The flow in the parallel distribution tubes 205,206,207,208 can be alternated such that one distribution tube in each double coil dispersal line 203, 204 flow at a time. The flow of effluent in the various distribution tubes is regulated in the headworks. A first distribution line valve 211 connects to a first distribution tube 205 and a third distribution tube 206 and a second distribution line valve 212 connected to a second distribution tube 208 and a fourth distribution tube 207. Alternating the first and second distribution line valves 211, 212 allow flow in one distribution tube in each double coil dispersal line at a time. The dispersal field 201 comprises a treatment media 104 and alternating flow allows a rest period for the treatment media 104. This means that the effluent is continually draining into the dispersal field but only in each tube 205, 206, 207, and 208 half the time. This allows the treatment media 104 an opportunity to rest. Treatment media has a lifespan and changing the media is very difficult and expensive. The wetted treatment media area 213 around each emitter is relatively small and this is the area that does all the work of treating the effluent. The effluent wets the wetted treatment area 213 a wetted distance W1 from the drip emitter 214 in the horizontal direction through capillary action. The effluent also travels upward through the same capillary action. Gravity then pulls the effluent downward through the treatment media into the native soil below. The ideal spacing of the emitters is so the wetted treatment areas touch which is a minimum distance W2 or roughly twice distance W1. Consequently, all the treatment media is utilized for treating the effluent and can be dosed at a much lower rate. This increases the efficient use of the sand media. Also, this allows the life of the treatment media to be extended, for example, twice as long, or throughout the useful life of a building.

The first and second double coiled dispersal lines 203, 204 further comprise drip emitters 214 and the alternating flow allows a rest period for the drip emitters 214. This in turn may increase life span of emitter function due to less frequent use per unit of time. For example an emitter that would normally last 20 years under continual use could last 40 years with alternating use. A plurality of drip emitters 214 may be spaced apart at a desired dosing location wherein, the desired dosing location has a maximum emitter density without overlapping wetted areas 213. To achieve this beneficial scenario the wetted areas 213 would touch but not overlap by keeping the emitters a minimum distance W2. The minimum distance W2 is different for different treatment media. For example, in sand the wetted distance W1 is about 3 inches. Therefore the minimum distance W2 is 6 inches between drip emitters 214.

In another example, the maximum emitter density (drip emitters 214 placed at the minimum distance W2) allows less flow at each emitter per a dosed volume of effluent. For example, a typical dosing at each emitter may be 0.42 Gallon per Hour (GPH) for a typical system but that could be reduced to 0.1-0.3 GPH when the spacing is at a maximum emitter density.

The double coil headworks 202 is typically automated. A manual headworks allows operation of the double coil headworks 202 that is simple and low cost. A first distribution line one way valve 209 and a second distribution line one way valve 210 allows back flushing the first and second double coil dispersal line 203, 204 without needing an additional manual or automated valve.

One example embodiment is a method of effluent dispersal comprising, controlling effluent flow in a headworks 202, dispersing effluent into a dispersal field 201 comprising, a first double coil dispersal line 203, wherein the first double coil dispersal line 203 comprises two distribution tubes 205, 206 substantially adjacent extending in a horizontal coil. The exemplary method of effluent dispersal wherein, dispersing effluent into a dispersal field further comprises a second double coil dispersal line 204 adjacent the first double coil dispersal line 203 wherein, a first distribution tube 205 from the first double coil dispersal line 203 and a first distribution tube from the second double coil dispersal line 204 (third distribution tube 206) flow in parallel. Further, a second distribution tube 208 from the first double coil dispersal line and a second distribution tube from the second double coil dispersal line (fourth distribution tube 207) flow in parallel. In a general way the method of effluent dispersal further comprises, alternating the flow in the parallel distribution tubes 205, 206 and 207, 208 such that one distribution tube in each double coil dispersal line 203, 204 flows at a time. Specifically, the method of effluent dispersal further comprises, alternating first and second distribution line valves 211, 212 to disperse effluent through one distribution tube in each double coil dispersal line 203, 204 at a time wherein, the first distribution line valve 211 is connected to a first distribution tube 205 and a third distribution tube 206 and the second distribution line valve 212 is connected to a second distribution tube 208 and a fourth distribution tube 207. Alternating the flow in the first double coil dispersal line 203 and the second double coil dispersal line 204 rests the treatment media 104 and the plurality of emitters 214. The method of effluent dispersal further comprises, spacing a plurality of drip emitters 214 at a desired dosing location wherein, a desired dosing location has a maximum emitter density without overlapping wetted areas 213. The method of effluent dispersal further comprises, operating the headworks 202 manually such that operation is simple and low cost. A further example of the exemplary method comprises back flushing the dispersal field 201 through a one way valve 209 at the end of the first double coil dispersal line 203. A second distribution line one way valve 210 is at the end of the second double coil distribution line 204.

Having described the invention what is claimed is:

1. A septic dispersal system comprising,
a headworks,
and a dispersal field wherein,
the dispersal field comprises a first double coil dispersal line, wherein
the first double coil dispersal line comprises two distribution tubes substantially adjacent extending in a horizontal coil,
a second double coil dispersal line adjacent the first double coil dispersal line wherein,
one distribution tube from the first double coil dispersal line and one distribution tube from the second double coil dispersal line flow in parallel
a second distribution tube from the first double coil dispersal line and a second distribution tube from the second double coil dispersal line flow in parallel
a flow in the parallel distribution tubes can be alternated such that one distribution tube in each double coil dispersal line flows at a time.

2. A septic dispersal system of claim 1 further comprising, a first distribution line valve connected to a first distribution tube and a third distribution tube and a second distribution line valve connected to a second distribution tube and a fourth distribution tube, wherein
alternating the first and second distribution line valves allow flow in one distribution tube in each double coil dispersal line at a time.

3. A septic dispersal system of claim 1 wherein the dispersal field comprises a treatment media and alternating flow allows a rest period for the treatment media.

4. A septic dispersal system of claim 1 wherein, the first and second double coiled dispersal lines further comprise drip emitters and the alternating flow allows a rest period for the drip emitters.

5. The septic dispersal system of claim 4 wherein, the maximum emitter density allows less flow at each emitter per a dosed volume of effluent.

6. The septic dispersal system of claim 1 further comprising,
a plurality of drip emitters, wherein
the plurality of emitters are spaced apart at a desired dosing location wherein,
the desired dosing location has a maximum emitter density without overlapping wetted areas.

7. The septic dispersal system of claim 1 further comprising a manual headworks wherein operation of the manual headworks is simple and low cost.

8. The septic dispersal system of claim 1 further comprising, a one way valve at the end of the dispersal field configured to allow back flushing the first double coil dispersal line.

9. A method of effluent dispersal comprising,
controlling effluent flow in a headworks,
dispersing effluent into a dispersal field comprising,
a first double coil dispersal line, wherein
the first double coil dispersal line comprises two distribution tubes substantially adjacent extending in a horizontal coil,
dispersing effluent into a dispersal field further comprises a second double coil dispersal line adjacent the first double coil dispersal line wherein,
a first distribution tube from the first double coil dispersal line and a first distribution tube from the second double coil dispersal line flow in parallel,
a second distribution tube from the first double coil dispersal line and a second distribution tube from the second double coil dispersal line flow in parallel,
alternating a flow in the parallel distribution tubes such that one distribution tube in each double coil dispersal line flows at a time.

10. The method of effluent dispersal of claim 9 further comprising,
alternating first and second distribution line valves to disperse effluent through one distribution tube in each double coil dispersal line at a time wherein,
the first distribution line valve is connected to a first distribution tube and a third distribution tube and the second distribution line valve is connected to a second distribution tube and a fourth distribution tube.

11. The method of effluent dispersal of claim 9 further comprising,
alternating the flow in the first double coil dispersal line and the second double coil dispersal line to rest a treatment media and a plurality of emitters.

12. The method of effluent dispersal of claim 9 further comprising,
spacing a plurality of drip emitters at a desired dosing location wherein,
a desired dosing location has a maximum emitter density without overlapping wetted areas.

13. The method of effluent dispersal of claim 9 further comprising,
operating the headworks manually such that operation is simple and low cost.

14. The method of effluent dispersal of claim 9 further comprising,
back flushing the dispersal field through a one way valve at the end of the first double coil dispersal line.

15. A septic dispersal system comprising,
a dispersal field wherein,
the dispersal field comprises a first double coil dispersal line, wherein
the first double coil dispersal line comprises two distribution tubes substantially adjacent extending in a horizontal coil,
a second double coil dispersal line adjacent to and spaced apart from the first double coil dispersal line wherein,
one distribution tube from the first double coil dispersal line and one distribution tube from the second double coil dispersal line flow in parallel,
a second distribution tube from the first double coil dispersal line and a second distribution tube from the second double coil dispersal line flow in parallel,
a flow in the parallel distribution tubes can be alternated such that one distribution tube in each double coil dispersal line flows at a time.

* * * * *